(12) United States Patent
Panter et al.

(10) Patent No.: US 11,178,447 B1
(45) Date of Patent: Nov. 16, 2021

(54) AUDIO SYNCHRONIZATION FOR AUDIO AND VIDEO STREAMING

(71) Applicant: Twitch Interactive, Inc., San Francisco, CA (US)

(72) Inventors: James Panter, Murrieta, CA (US); Daniel Campanile, Lake Elsinore, CA (US); Alexander Tyler, Oakland, CA (US); Sang Jin Lee, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 16/867,471

(22) Filed: May 5, 2020

(51) Int. Cl.
*H04N 21/43* (2011.01)
*H04N 21/4223* (2011.01)
*H04N 21/2187* (2011.01)

(52) U.S. Cl.
CPC ..... *H04N 21/4307* (2013.01); *H04N 21/2187* (2013.01); *H04N 21/4223* (2013.01)

(58) Field of Classification Search
CPC ........... H04N 21/4307; H04N 21/2187; H04N 21/4223
USPC ...................................................... 348/515
See application file for complete search history.

(56) References Cited

U.S. PATENT DOCUMENTS

| | | | | |
|---|---|---|---|---|
| 5,040,081 | A * | 8/1991 | McCutchen | G11B 27/028 386/207 |
| 9,640,159 | B1 * | 5/2017 | Tcheng | G10H 1/0008 |
| 9,697,849 | B1 * | 7/2017 | Tcheng | G06F 3/165 |
| 2007/0055398 | A1 * | 3/2007 | Steinberg | G10L 25/48 700/94 |
| 2010/0100923 | A1 * | 4/2010 | Toiyama | H04N 21/4394 725/131 |
| 2017/0230610 | A1 * | 8/2017 | Tcheng | G11B 27/031 |
| 2018/0192080 | A1 * | 7/2018 | Henaire | H04N 21/2353 |
| 2019/0080703 | A1 * | 3/2019 | Chebiyyam | H04S 3/008 |

FOREIGN PATENT DOCUMENTS

| | | | | |
|---|---|---|---|---|
| EP | 0838960 A2 * | 4/1998 | ....... | H04N 21/44008 |
| WO | WO-2010052850 A1 * | 5/2010 | ......... | H04N 21/4394 |

* cited by examiner

*Primary Examiner* — Michael Lee
(74) *Attorney, Agent, or Firm* — BakerHostetler

(57) ABSTRACT

A computing device may receive video content along with first audio content that is synchronized with the video content. The computing device may also receive second audio content that is not synchronized with the video content. The computing device may, in turn, transmit output content that includes the video content and the second audio content. A second portion of the second audio content may be identified that has second audio characteristics that are within a selected range of similarity to first audio characteristics of a first portion of the first audio content. A temporal offset may be calculated between the first portion and the second portion. The video content and the second audio content may be synchronized within the output content by delaying, by an amount of the temporal offset, a transmission of the second audio content relative to a transmission of video content.

19 Claims, 11 Drawing Sheets

Select Video Device for Streaming:

Camera ABC ▷ 511

Select Audio Device(s) to Synchronize:

☒ Audio Device DEF  521
☐ Audio Device GHI  522
☒ Audio Device JKL  523
☐ Audio Device MNO  524

Synchronize 505

AUDIO SYNCHRONIZATION FOR AUDIO AND VIDEO STREAMING

BACKGROUND

The widespread use of audio and video streaming has increased rapidly in recent years. A streamer, as used herein, refers to a user that provides content that is streamed to viewers. In some examples, a streamer may provide, using a webcam or other camera, video of himself or herself for transmission to viewers. In one specific example, a streamer may be a video game player, and the streamer may provide webcam video of himself or herself playing a game and commenting on gameplay. The webcam video may be streamed in combination with game video that is captured from the video game. In some examples, an integrated audio device, such as a microphone, may be built-in to or otherwise integrated with the camera, and the integrated audio device may acquire audio from the streamer, such as audio of the streamer commenting on gameplay. Audio and video signals are typically provided to a computing device via capture components, which may add small amounts of delay to the signals. Different types of capture components may add different amounts of delay. However, both the video from the camera and the audio from the integrated audio device may typically be captured by the streamer's computing device using the same capture component. This may allow the video from the camera the audio from the integrated audio device to be synchronized with one another.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating an example synchronization selection interface that may be used in accordance with the present disclosure.

DETAILED DESCRIPTION

Figure 1:
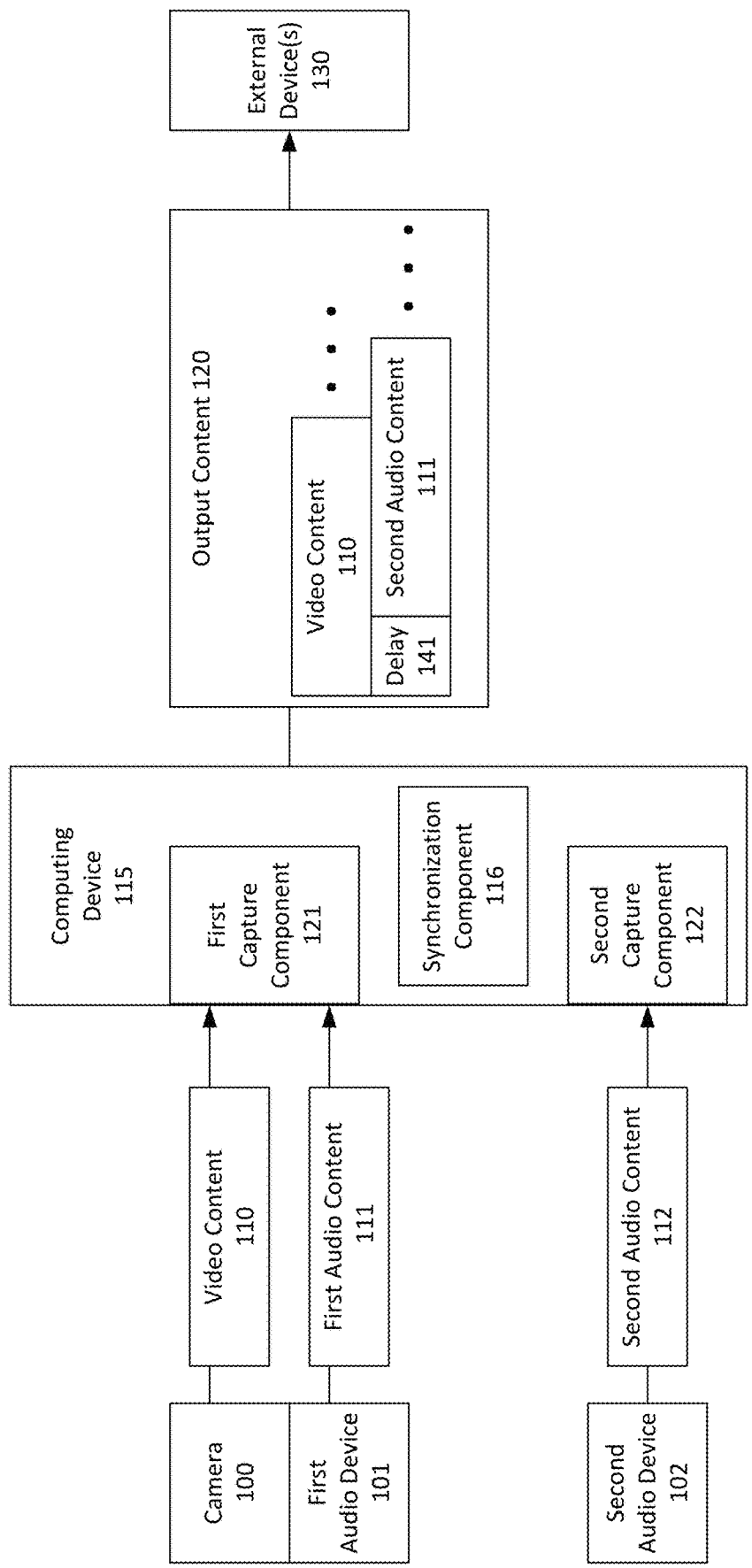
FIG. 1 is a diagram illustrating an example audio and video synchronization system that may be used in accordance with the present disclosure.

Techniques for audio synchronization for audio and video streaming are described herein. As described above, in some examples, a streamer may provide, using a webcam or other camera, video of himself or herself for transmission to viewers. In one specific example, a streamer may be a video game player, and the streamer may provide webcam video of himself or herself playing a game and commenting on gameplay. The webcam video may be streamed in combination with game video that is captured from the video game. In some examples, an integrated audio device, such as a microphone, may be built-in to or otherwise integrated with the camera, and the integrated audio device may acquire audio from the streamer, such as audio of the streamer commenting on gameplay. In some examples, both the video from the camera and the audio from the integrated audio device may be captured by the streamer's computing device using the same capture component. This may allow the video from the camera the audio from the integrated audio device to be synchronized with one another.

In some cases, however, in addition to the integrated audio device, a second audio device may also be available to the streamer, such as a higher-quality audio device that may be connected to the streamer's computing device and that may enable the streamer's voice to be acquired at higher-quality than the integrated audio device. For these reasons, the streamer may wish to use this higher-quality audio device as the source from which to provide audio that accompanies the camera video of the streamer. In this scenario, the audio content from the integrated audio device may be referred to as first audio content, while the audio content from the higher-quality audio device may be referred to as second audio content. Thus, in this scenario, the streamer's computing device may provide output content that includes the video content from the camera in combination with the second audio content from the higher-quality audio device. This output content may be streamed to one or more other devices for playing to viewers.

One problem related to the above-described scenario is that the higher-quality audio device may be captured by the streamer's computing device using a different type of capture component than the camera. This may result in the second audio content from the higher-quality audio device not being synchronized with the video content when the second audio content is received by the computing device. For example, an amount of delay added by the capture component for the video camera and integrated audio device may be longer than an amount of delay added by the capture component for the video camera and integrated audio device. This may result in the video content from the camera lagging slightly behind the second audio content from the higher-quality audio device. For example, when the video content shows the streamer's mouth moving to speak words, the audio content may not match the words that are being spoken by the streamer in the video content.

In order to alleviate these and other concerns, the techniques described herein may provide an automated process to synchronize the second audio content from the higher-quality audio device with the video content from the camera.

In some examples, the user may provide little or no manual input in order to cause this synchronization to occur. In one specific example, the user's input may be limited to merely selecting the higher-quality audio device and/or activating a single button or control to cause the synchronization to occur. As described above, because it may be captured using the same capture component as the video camera, the first audio content from the camera's integrated audio device may be synchronized with the video content. Thus, in some examples, the techniques described herein may attempt to synchronize the second audio content from the higher-quality audio device with the first audio content from the integrated audio device. This will also result in the second audio content from the higher-quality audio device also being synchronized with the video content.

In some examples, to synchronize the first audio content and the second audio content, the system may sample the first and the second audio content. The system may then analyze a first portion of the first audio content and attempt to match a first portion of the first audio content to a matching portion of the second audio content. In order to perform this matching, the system may determine first audio characteristics of the first audio portion and then identify a portion of the second audio content that has second audio characteristics that are within a selected range of similarity to the first audio characteristics. For example, the system may compare the first audio characteristics of the first portion to audio characteristics of multiple different portions of the second audio content until a match within the selected range of similarity is identified. In some examples, the compared audio characteristics of the audio portions may include frequency, amplitude and other characteristics, such as may be calculated by performing a Fast Fourier Transform (FFT) on each audio portion. In some examples, once the first portion of the first audio content is matched to a second portion of the second audio content, the system may attempt to further confirm the match, such as by confirming that adjacent portions of the first and the second audio content match one another.

Upon determining matching portions of the first and the second audio content, the system may determine a temporal offset between these matching portions, and this temporal offset may indicate a time difference between the first the first and the second audio content. The system may then synchronize, within the output content, the video content and the second audio content. Specifically, in some examples, this synchronizing may be achieved by delaying, by an amount of the temporal offset, a transmission of the second audio content relative to a transmission of video content.

FIG. 1 is a diagram illustrating an example audio and video synchronization system that may be used in accordance with the present disclosure. As shown in FIG. 1, a camera 100, such as a webcam, provides video content 110 to a computing device 115. A first audio device 101 provides first audio content 111 to the computing device 115. In the example of FIG. 1, the first audio device 101 is integrated with the camera 100. Additionally, in the example of FIG. 1, both the video content 110 and the first audio content 111 are captured by the computing device 115 using the same capture component, which is first capture component 121. Thus, the video content 110 and the first audio content 111 are synchronized with one another. The video content 110 is included in output content 120, which is transmitted by the computing device 115 to one or more external devices 130. In some examples, a user may provide, using camera 100, video of himself or herself for transmission to viewers. In one specific example, the user may be a video game player, and the video content 110 may include video of the user playing a game and commenting on gameplay.

As also shown in FIG. 1, a second audio device 102, such as a second microphone, provides second audio content 112 to the computing device 115. In some examples, the second audio device 102 may be a higher-quality audio device that may enable the user's voice to be acquired at higher-quality than the first audio device 101. For these reasons, the user may wish to use this higher-quality audio device as the source from which to provide audio that accompanies the camera video of the streamer. In the example of FIG. 1, the output content 120 includes the video content 110 in combination with the second audio content 112 from the second audio device 102.

The output content 120 may be transmitted to the external devices 130 over one or more communications networks, for example one or more local area networks (LAN's) and/or one or more wide area networks (WAN's), such as the Internet. In some examples, the computing device 115 may stream the output content 120 directly to one or more viewer devices, on which the output content 120 is played to viewers. Also, in some examples, the computing device 115 may stream the output content 120 to an intermediary, such as a video streaming service, which, in turn, transmits the output content 120 to one or more viewer devices. The output content 120 may be transmitted from the computing device 115 to the external devices 130 using streaming transmission techniques, in which portions of transmitted content are received and played while subsequent portions of the transmitted content are being transmitted. In some examples, the output content 120 may be transmitted to the external devices 130 and played using live streaming techniques. For example, video content of an event (e.g., a streamer speaking in front in a webcam) may be transmitted to viewers 130A-C, and at least part of the video content may be played while the event is still occurring (e.g., while the streamer is continuing to speak in front of the webcam), albeit with some small amounts latency between the time that video content is captured and the time that the video is eventually played to viewers.

In the example of FIG. 1, the second audio content 112 is captured by the computing device 115 using second capture component 122, which is a different type of capture component than first capture component 121. This results in the second audio content 112 not being synchronized with the video content 110 when the second audio content 112 is initially received by the computing device 115. For example, an amount of delay added by the first capture component 121 to the video content 110 and the first audio content 111 may be longer than an amount of delay added by the second capture component 122 to the second audio content 112. This may result in the video content 110 lagging slightly behind the second audio content 112. For example, when the video content 110 shows the streamer's mouth moving to speak words, the second audio content 112 may not match the words that are being spoken by the streamer in the video content 110.

In order to alleviate these and other concerns, a synchronization component 116 may synchronize the second audio content 112 with the video content 110. As described above, because it is captured using the same capture component as the video content, the first audio content 111 is synchronized with the video content 110. Thus, the synchronization component 116 may synchronize the second audio content 112 with the first audio content 111. This will also result in the second audio content 112 being synchronized with the video content 110. In some examples, the synchronization component 116 may include software provided by a video streaming service to which the output content 120 may be transmitted from the computing device 115.

Figure 2:
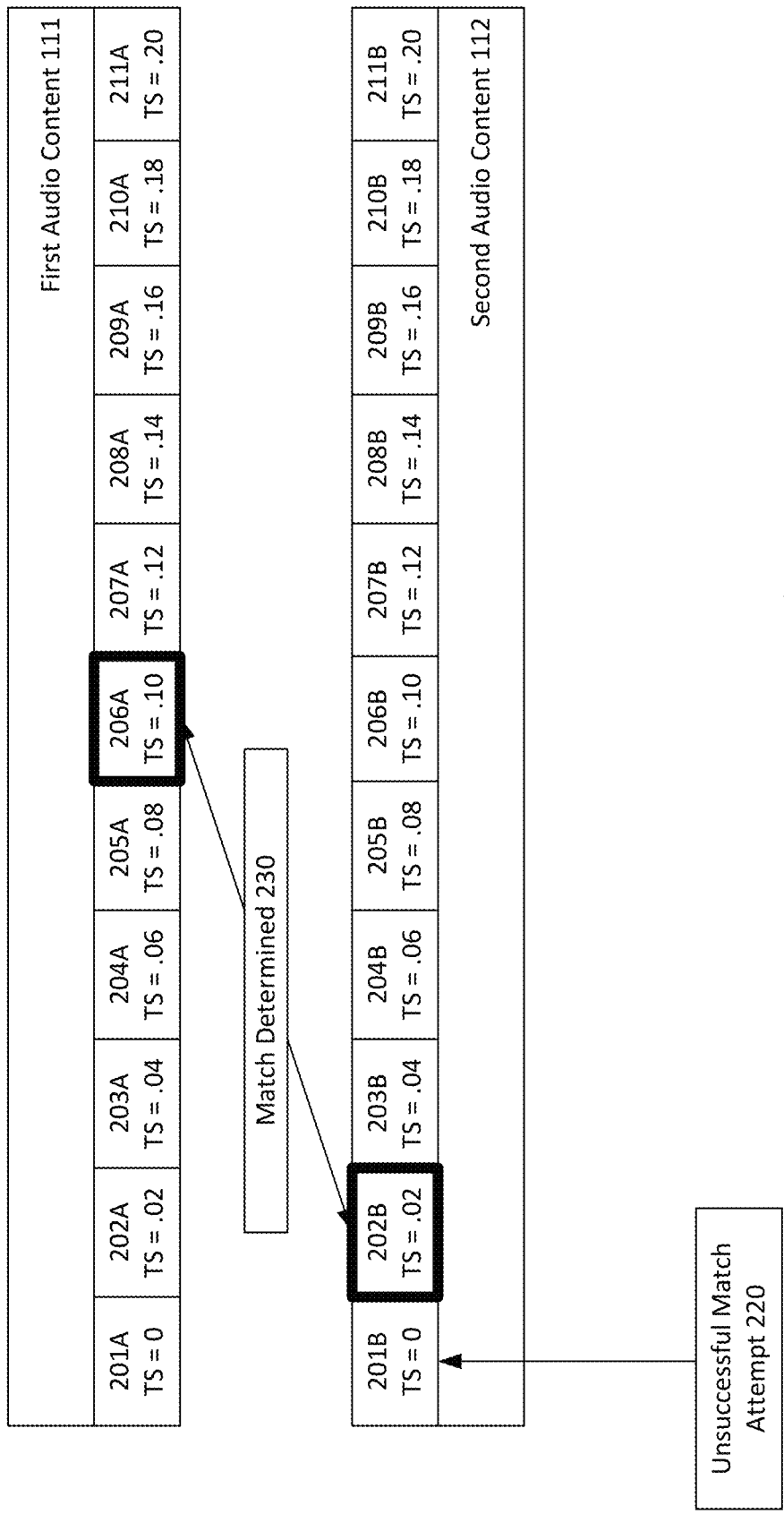
FIG. 2 is a diagram illustrating an example audio portion match that may be used in accordance with the present disclosure.

In some examples, to synchronize the first audio content 111 with the second audio content 112, the synchronization component 116 may sample the first audio content 111 and the second audio content 112. Referring now to FIG. 2, a sample of the first audio content 111 is shown that includes audio portions 201A-211A. Additionally, a sample of the second audio content 112 is shown that includes audio portions 201B-211B. In the example of FIG. 2, each of the audio portions 201A-211A and 201B-211B is assigned a timestamp that corresponds to a relative time at which the audio portion is sampled by the synchronization component 116. Additionally, in FIG. 2, the timestamp assigned to each of the audio portions 201A-211A and 201B-211B is indicated by the abbreviation TS. For example, audio portions 204A and 204B include the text TS=0.06, to indicate that they each have a timestamp value of 0.06. In this specific example, the timestamp values are in units of seconds, meaning that each of the each of the audio portions 201A-211A and 201B-211B are 0.02 seconds in duration. It is noted, however, that these are merely example values and that audio samples may be broken into portions having any desired time duration. In this example, audio portions that are sampled at the same time as one another (e.g., audio portions 201A and 201B, audio portions 202A and 202B, etc.) have the same timestamp as one another.

In the example of FIG. 2, the synchronization component 116 may analyze audio portion 206A of the first audio content 111 and attempt to match the audio portion 206A to a matching portion of the second audio content 112. In order to perform this matching, the synchronization component 116 may determine audio characteristics of audio portion 206A and then identify a portion of the second audio content 112 that has second audio characteristics that are within a selected range of similarity to the audio characteristics of audio portion 206A. For example, the synchronization component 116 may compare the audio characteristics of audio portion 206A to audio characteristics of multiple different portions of the second audio content until a match within the selected range of similarity is identified. In some examples, the compared audio characteristics of the audio portions may include frequency, amplitude and other characteristics, such as may be calculated by performing a Fast Fourier Transform (FFT) on each audio portion.

In the example of FIG. 2, the synchronization component 116 first compares the audio characteristics of audio portion 206A to the audio characteristics of audio portion 201B of second audio content 112. However, this match attempt is unsuccessful, meaning that it is determined that the audio characteristics of audio portion 206A are not within the selected range of similarity to the audio characteristics of audio portions 201B. This unsuccessful match attempt is indicated by the unsuccessful match attempt box 220 of FIG. 2. Next, in the example of FIG. 2, the synchronization component 116 compares the audio characteristics of audio portion 206A to the audio characteristics of audio portion 202B. In this example, the audio characteristics of audio portion 206A are determined to match the audio characteristics of audio portion 202B, meaning that the audio characteristics of audio portion 206A are determined to be within the selected range of similarity the audio characteristics of audio portion 202B. The matching of audio portion 206A and audio portion 202B is indicated by match determined box 230 of FIG. 2. In some examples, the selected range of similarity may be a selected value, such as a selected numerical value, a selected percentage, a selected ratio, and the like, which represents a relative similarity of audio characteristics between compared audio portions.

In some examples, to improve the efficiency of the matching process, a maximum offset threshold may be determined that corresponds to a maximum expected time offset between the first audio content 111 and the second audio content 112. The search for matching audio portions in the first audio content 111 and the second audio content 112 may then be limited to portions that are within the maximum offset threshold of one another. For example, in some cases, the synchronization component 116 may determine that it is unlikely that the first audio content 111 and the second audio content 112 will be out of synchronization by more than one second. In this example, the maximum offset threshold may be set to one second, meaning that the synchronization component 116 will not attempt to match audio portions that are more than one second apart from one another. For example, consider a scenario in which an audio portion in the first audio content has a timestamp value of 1.5 seconds. In this example, the synchronization component 116 may attempt to match that audio portion only to portions of the second audio content that have a timestamp value between 0.5 seconds and 2.5 seconds. This is because the values of 0.5 seconds and 2.5 seconds are each within one second of 1.5 seconds. The synchronization component 116 would not attempt to match that audio portion to portions of the second audio content had timestamp value below 0.5 or above 2.5. This may improve efficiency by not using resources to attempt to match audio portions that are unlikely to match one another.

To also improve the efficiency, in some examples, a sample may be segmented into audio portions such that adjacent audio portions partially overlap one another. For example, audio portion 206A might partially overlap with audio portion 205A and/or with audio portion 207A. As another example, audio portion 202B might partially overlap with audio portion 201B and/or with audio portion 203B. This may improve efficiency, such as by reducing the effects of short periods of noise, errors or other differences that could cause an entire audio portion to be unmatchable.

Figure 3:
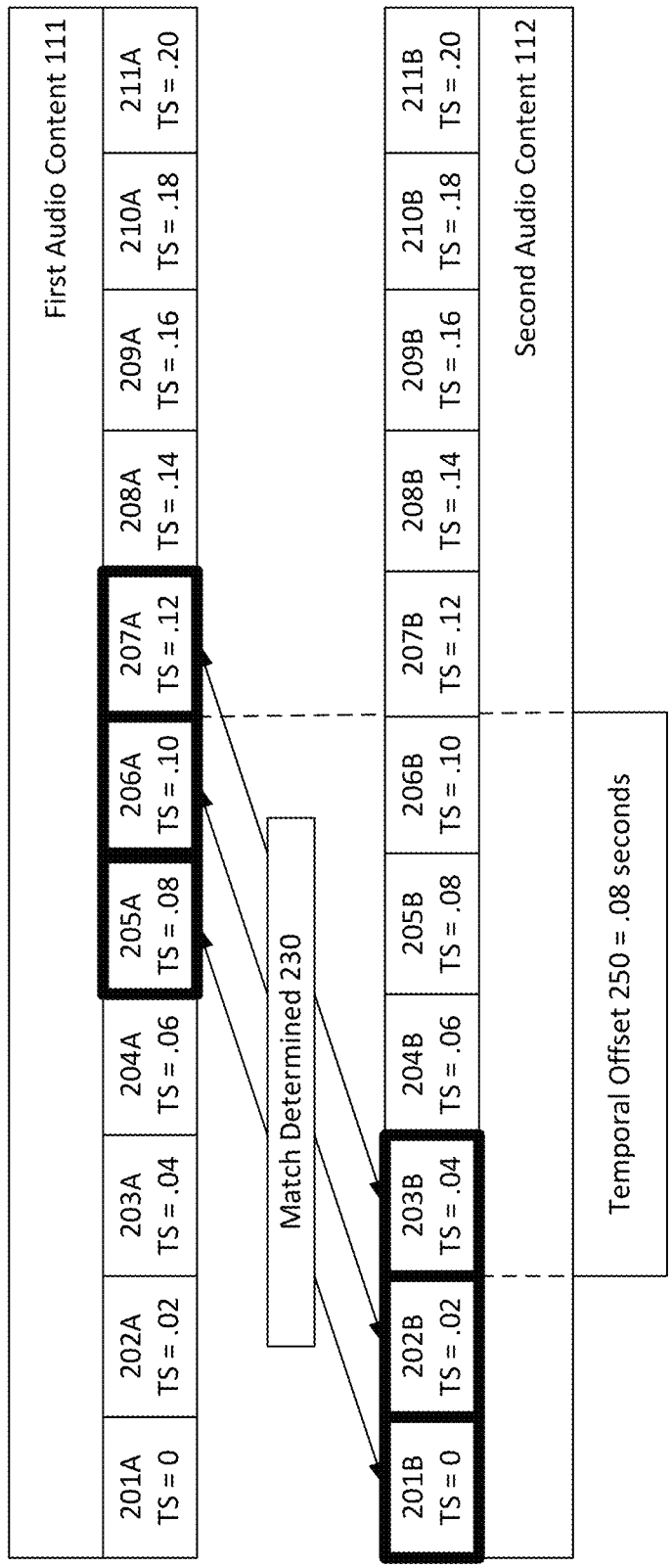
FIG. 3 is diagram illustrating example adjacent audio portion matches that may be used in accordance with the present disclosure.

In some examples, once an audio portion from the first audio content is matched to an audio portion from the second audio content, the synchronization component 116 may attempt to further confirm the match, such as by confirming that adjacent portions of the first and the second audio content match one another. Referring now to FIG. 3, an example is shown in which it the synchronization component 116 confirms that the audio portion 205A, which immediately precedes audio portion 206A, matches audio portion 201B, which immediately precedes audio portion 202B. Additionally, the synchronization component 116 confirms that the audio portion 207A, which immediately follows audio portion 206A, matches audio portion 203B, which immediately follows audio portion 202B. In some examples, in order to confirm a match, it may be required that a particular number of successive audio portions (e.g., three in a row, ten in a row, etc.) must match each other—or in some examples that at least a threshold amount of successive audio portions must match (e.g., at least nine out of ten in a row, etc.). If audio portions 206A and 22 are true matching portions (and not a false positive match), then it is expected that adjacent pairs of audio portions (e.g., audio portions 205A and 201B, audio portions 207A and 203B, etc.) will also match one another. Thus, by confirming that the adjacent pairs of audio portions match one another, the synchronization component 116 may confirm that each of the pairs of matching components are true matches and are not false positives.

In some examples, upon determining and confirming a matching of audio portions between the first audio content 111 and the second audio content 112, the synchronization component 116 may a calculate temporal offset 250 between the matching portions. As shown in FIG. 3, the temporal offset 250 is the time difference between audio portion 206A and audio portion 202B. The temporal offset 250 will also be equal to the time difference between other sets of matching portions, such as between audio portion 205A and audio portion 201B, between audio portion 207A and audio portion 203B, etc. The temporal offset 250 may correlate to an offset between the times that matching audio portions are sampled by synchronization component 116. In the example of FIG. 3, the temporal offset 250 is 0.08 seconds. In some examples, the temporal offset 250 may be calculated based on the difference between the timestamps of the matching audio portions. For example, the difference between the timestamp of audio portion 206A (which is 0.10) and the timestamp of audio portion 202B (which is 0.02) is a value of 0.08, which correlates to a difference of 0.08 seconds in this example.

Figure 4:
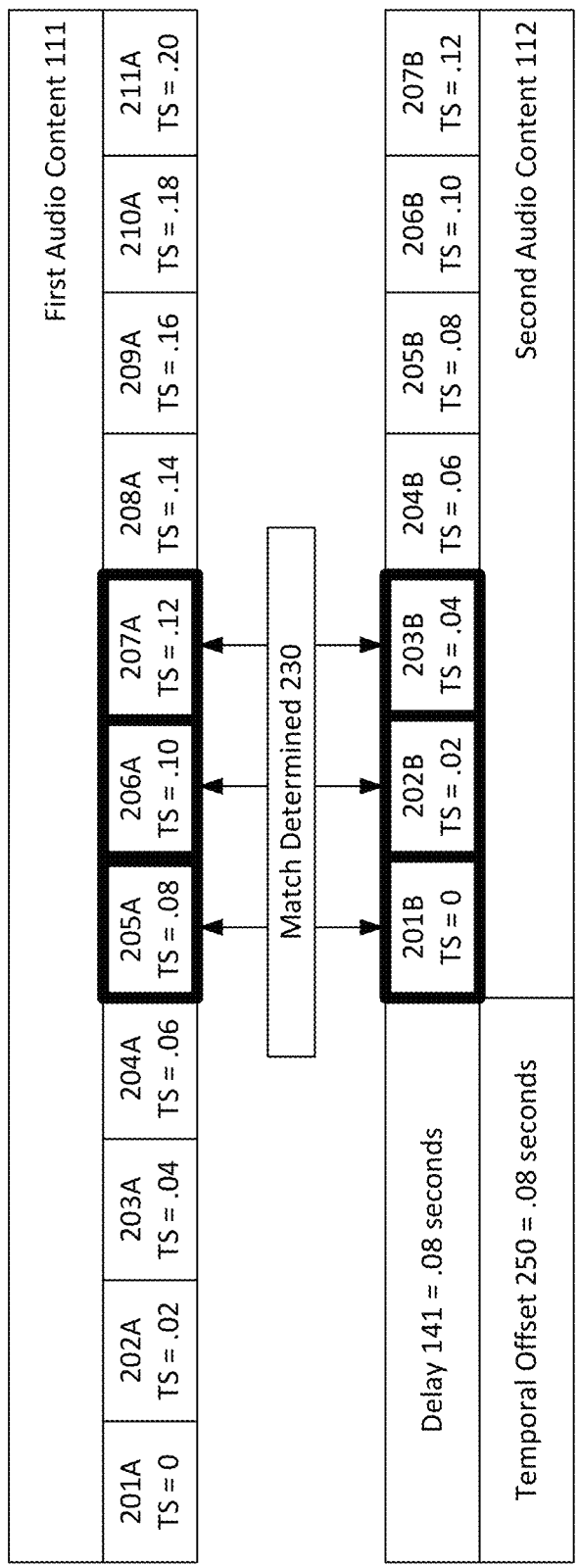
FIG. 4 is a diagram illustrating an example audio content transmission delay that may be used in accordance with the present disclosure.

After determining the temporal offset 250 between the first audio content 111 and the second audio content 112, the synchronization component 116 may then synchronize the first audio content 111 and the second audio content 112. Specifically, in some examples, this synchronizing may be achieved by delaying, by an amount of the temporal offset 250, the second audio content 112 relative to the first audio content 111. For example, referring now to FIG. 4, it is seen that a delay 141 of 0.08 seconds is added to the transmission of the second audio content 112. As shown in FIG. 4, the delay 141 of 0.08 seconds is equal to the temporal offset 250 of 0.08 seconds. As also shown in FIG. 4, the delay 141 of 0.08 seconds causes the second audio content 112 to be synchronized with the first audio content 111. Specifically, as shown in FIG. 4, the matching pairs of audio portions (e.g., audio portions 205A and 201B, audio portions 206A and 202B, audio portions 207A and 203B, etc.) are vertically aligned with one another, thereby indicating the synchronization between first audio content 111 and the second audio content 112.

As described above, because the first audio content 111 is synchronized with the video content 110, the synchronizing of the second audio content 112 and the first audio content 111 will also cause the second audio content 112 to be synchronized with the video content 110. Thus, referring back to FIG. 1, it is seen that the synchronization component 116 may apply the delay 141 of 0.08 seconds to the transmission of the second audio content 112 relative to the transmission of the video content 110 within the output content 120. By applying the delay 141 to transmission of the second audio content 112 relative to the transmission of the video content 110, the synchronization component 116 may synchronize the second audio content 112 with the video content 110 within the output content 120. For example, when the video content 110 shows the streamer's mouth moving to speak words, the second audio content 112 may, after being synchronized with the video content 110, match the words that are being spoken by the streamer in the video content 110.

Figure 6:
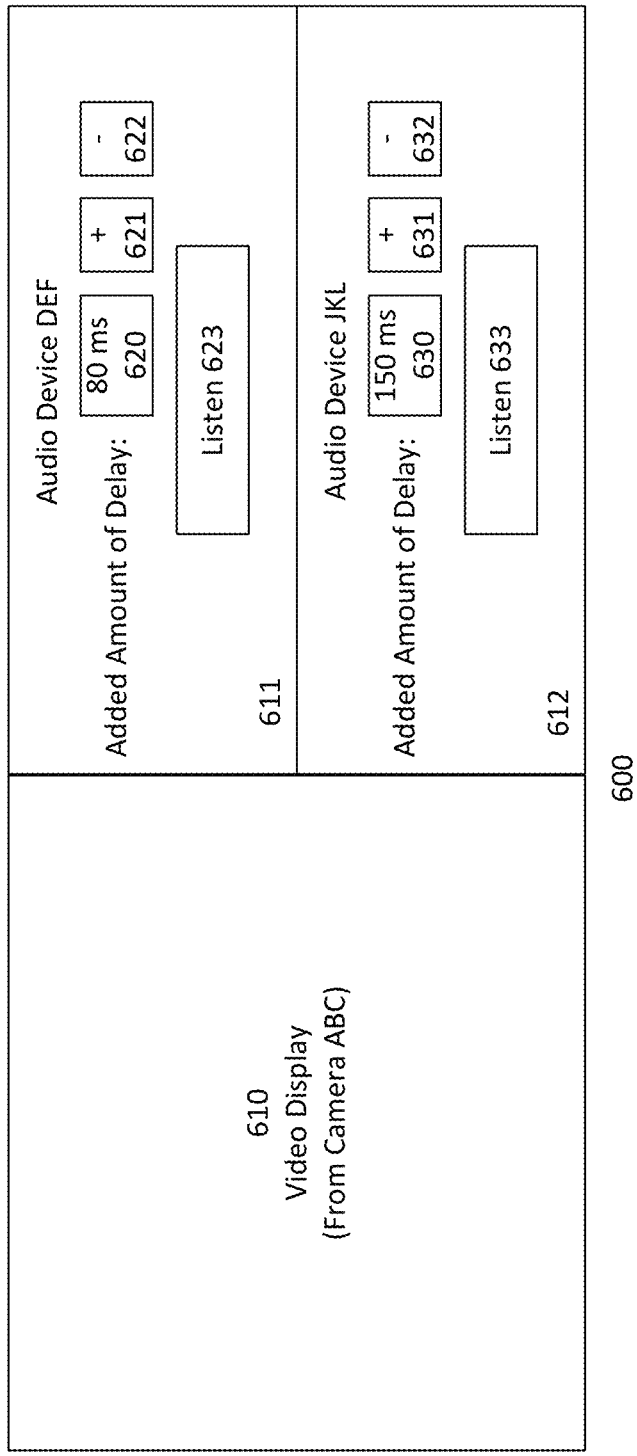
FIG. 6 is a diagram illustrating an example synchronization management interface that may be used in accordance with the present disclosure.

Referring now to FIGS. 5 and 6, some example user interfaces for audio and video synchronization will now be described in detail. In particular, FIG. 5 shown a selection interface 500 that may be employed to select audio and video components to be synchronized in a streaming video output of a computing device 115. In some examples, the interfaces 500 and 600 of FIGS. 5 and 6 may be generated by synchronization component 116 of FIG. 1. As shown in FIG. 5, selection interface 500 includes a drop-down menu 511 that allows a user of computing device 115 to select a video device from which to capture the video content 110 for streaming in the output content 120 from the computing device 115 to external devices 130. In the example of FIG. 5, the user has selected Camera ABC as the selected video device. Additionally, selection interface 500 includes a listing of available audio devices that may be selected to synchronize with the selected video device (Camera ABC) in the output content 120. In the example of FIG. 5, this listing includes four audio devices: Audio Device DEF, Audio Device GHI, Audio Device JKL and Audio Device MNO. Each listed audio device has a respective checkbox 521-524 that allows the user to select the corresponding audio device. In the example of FIG. 5, the user has selected two audio devices (Audio Device DEF and Audio Device JKL) to synchronize with the selected video device (Camera ABC), as indicated by the selection of the respective two checkboxes 521 and 523. In some examples, in order to determine which video and audio devices to show in selection interface 500, the synchronization component 116 may scan computing device 115 to determine available video and audio devices that are connected to the computing device 115. In other examples, synchronization component 116 may obtain this information by querying one or more other components executing on the computing device 115, such as one or more operating system or other components. Upon making the desired selections of video and audio components via drop-down menu 511 and checkboxes 521-524, the synchronization process may be initiated by selecting the synchronize button 505. It is noted that selection interface 500 is merely one example user interface for selection of video and audio devices to synchronize and that many other types of interfaces with other controls and features may be employed.

Upon selection of the synchronization button 505, a synchronization process may be performed for each of the selected audio devices (Audio Device DEF and Audio Device JKL), for example using the synchronization techniques described above with reference to FIGS. 1-4. Specifically, Camera ABC may have an integrated audio device that is synchronized with the video from Camera ABC. In a first synchronization process, Audio Device DEF may be synchronized with Camera ABC. In this first synchronization process, audio from Audio Device DEF (which is the second audio content 112 in this example) may be synchronized with audio from the audio device that is integrated with Camera ABC (which is the first audio content 111 in this example). This may cause the audio from Audio Device DEF to be synchronized with the video from Camera ABC. Additionally, in a second synchronization process, Audio Device JKL may be synchronized with Camera ABC. In this second synchronization process, audio from Audio Device JKL (which is the second audio content 112 in this example) may be synchronized with audio from audio device that is integrated with Camera ABC (which is the first audio content 111 in this example). This may cause the audio from Audio Device JKL to be synchronized with the video from Camera ABC.

Upon performance of these synchronization processes, the calculated delay times for the audio from Audio Device DEF and from Audio Device JKL may be displayed. Referring now to FIG. 6, a management interface 600 is shown that displays calculated delay times and allows adjustment of the calculated delay times. As shown in FIG. 6, management interface 600 includes a video display 610 that displays video from the selected video device (Camera ABC). Additionally, management interface 600 includes a section 611 that shows the delay to the audio from Audio Device DEF that is calculated by synchronization component 116 in order to synchronize the audio from Audio Device DEF with the video from Camera ABC. As shown in field 620, the synchronization component 116 has calculated that it is necessary to delay the audio from Audio Device DEF by 80 milliseconds (ms) in order to synchronize the audio from Audio Device DEF with the video from Camera ABC.

In addition to merely displaying the calculated delay, the management interface 600 enables the user to verify and adjust (if necessary) the calculated delay. Specifically, in order to play audio from Audio Device DEF, the user may select listen button 623. Selection of listen button 623 will cause the audio from Audio Device DEF to be played with the current selected delay of 80 ms. This may allow the user to compare the audio from Audio Device DEF (with a delay of 80 ms) to the video from Camera ABC that is shown in the video display 610. For example, the user may watch the video to see how the mouth and lips of the person shown in the video are moving and may confirm that words that are spoken in the audio are synchronized with movement of the speaker's mouth in the audio. In some examples, if the audio from Audio Device DEF appears to not be exactly synchronized with the video shown in the video display, then the user may fine-tune the amount of delay using buttons 621 and 622. Specifically, the user may select button 621 to add additional delay to the audio from Audio Device DEF, and user may select button 622 to reduce the delay to the audio from Audio Device DEF. The selection of buttons 621 and 622 will cause the delay value shown in field 620 to be respectively increased or decreased.

The management interface 600 also includes a section 612 that shows the delay to the audio from Audio Device JKL that is calculated by synchronization component 116 in order to synchronize the audio from Audio Device JKL with the video from Camera ABC. As shown in field 630, the synchronization component 116 has calculated that it is necessary to delay the audio from Audio Device JKL by 150 milliseconds (ms) in order to synchronize the audio from Audio Device JKL with the video from Camera ABC. Selection of listen button 633 will cause the audio from Audio Device JKL to be played with the current selected delay of 150 ms. This may allow the user to compare the audio from Audio Device JKL (with a delay of 150 ms) to the video from Camera ABC that is shown in the video display 610. In some examples, if the audio from Audio Device JKL appears to not be exactly synchronized with the video shown in the video display, then the user may fine-tune the amount of delay using buttons 631 and 632. Specifically, the user may select button 631 to add additional delay to the audio from Audio Device JKL, and user may select button 632 to reduce the delay to the audio from Audio Device JKL. The selection of buttons 631 and 632 will cause the delay value shown in field 630 to be respectively increased or decreased. It is noted that management interface 600 is merely one example user interface for display and adjustment of delay times and that many other types of interfaces with other controls and features may be employed.

Figure 7:
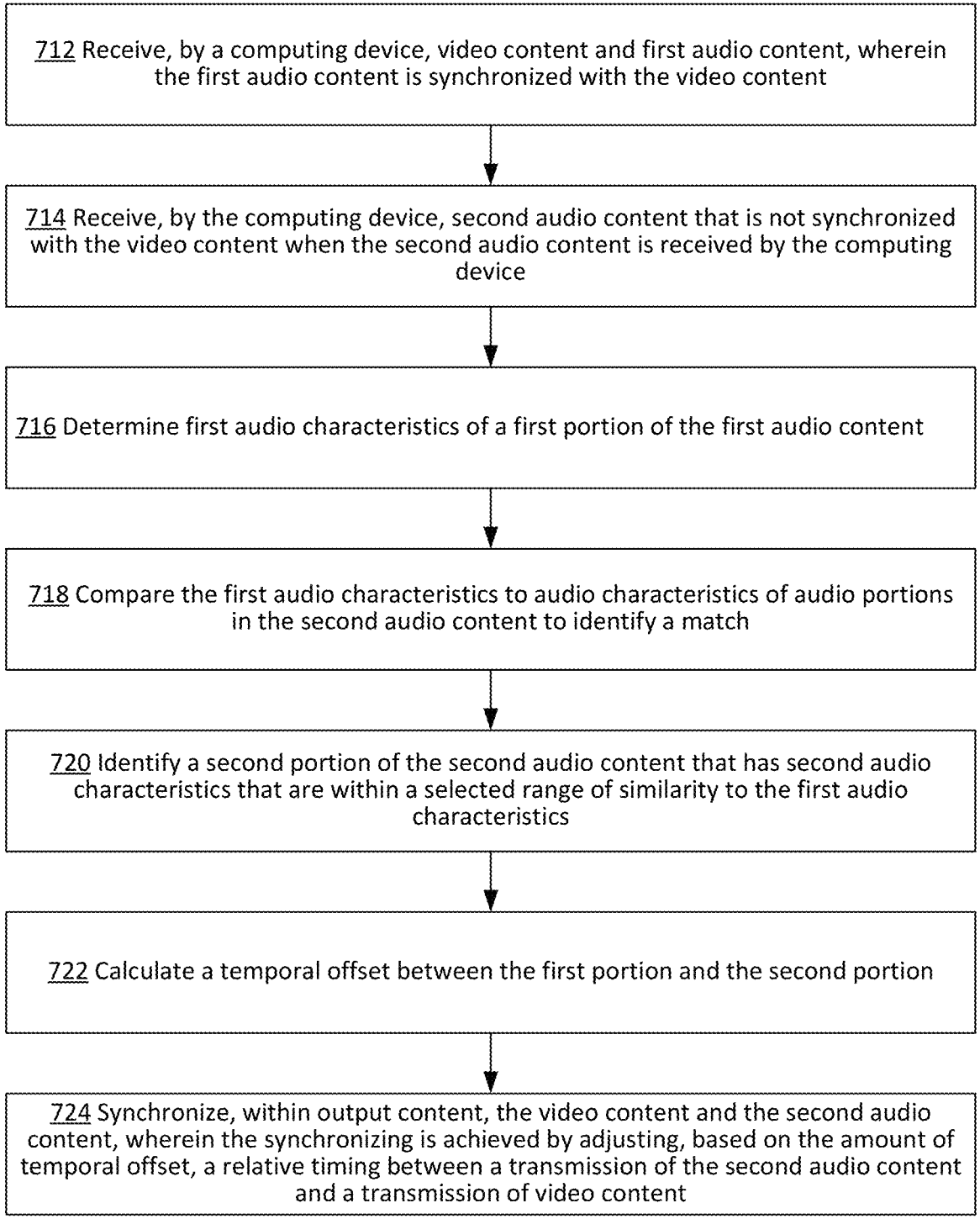
FIG. 7 is a flowchart illustrating an example process for audio and video synchronization that may be used in accordance with the present disclosure.

FIG. 7 is a flowchart illustrating an example process for audio and video synchronization that may be used in accordance with the present disclosure. As shown, the process of FIG. 7 is initiated at operation 712, at which video content and first audio content are received by a computing device. For example, as shown in FIG. 1, video content 110 provided by a camera 100 is received by computing device 115 via first capture component 121. Additionally, first audio content 111 provided by first audio device 101 is received by computing device 115 via first capture component 121. The first audio content is synchronized with the video content. As described above, because the first audio content 111 and the video content 110 are received by the computing device 115 via the same capture component (first capture component 121), they are synchronized with one another when they are received by the computing device 115. In the example of FIG. 1, the first audio device 101 is integrated with the camera 100. The video content may be included in output content that is transmitted by the computing device. For example, as shown in FIG. 1, the video content 110 is included in output content 120. In some examples the video content is live video content that is transmitted by the computing device and played to viewers at external devices using live streaming techniques.

At operation 714, second audio content is received by the computing device. For example, as shown in FIG. 1, second audio content 112 provided by second audio device 102 is received by computing device 115 via second capture component 122. The second audio content is not synchronized with the video content when the second audio content is received by the computing device. As described above, because the video content 110 and the second audio content 112 are received by the computing device 115 via different capture components (first capture component 121 and second capture component 122), the second audio content 112 is not synchronized with the video content 110 when the second audio content 112 is received by the computing device 115. The second audio content may also be included in the output content. As shown in FIG. 1, the second audio content 112 is included in output content 120 in combination with the video content 110. In some examples, the video content 110 includes video of a user, and the first audio content 111 and the second audio content 112 include audio of words that are spoken by the user in the video content 110. Also, in some examples, second audio device 102 is a higher-quality audio device than the first audio device 101. For example, the second audio device 102 may enable the streamer's voice to be acquired at higher-quality than the first audio device 101.

At operation 716, first audio characteristics of a first portion of the first audio content are determined. As described above, in some examples, the first audio characteristics may be first frequency domain characteristics of the first portion. The first frequency domain characteristics may be determined based at least in part on a Fast Fourier Transform (FFT), such as by performing an FFT on the first audio portion to convert the first audio portion into the frequency domain. At operation 718, the first audio characteristics are compared to a plurality of audio characteristics of a plurality of portions of the second audio content to identify a portion of the second audio content that matches the first portion. For example, as shown in FIG. 2, audio characteristics of audio portion 206A may be compared to audio characteristics of audio portion 201B. This may be an unsuccessful match attempt, meaning that the audio characteristics of audio portion 206A are not within a selected range of similarity to audio characteristics of audio portion 201B. The audio characteristics of audio portion 206A may then be compared to audio characteristics of audio portion 202B. In some examples, the compared portions of the second audio content may partially overlap one another. For example, audio portions 201B and 202B may partially overlap one another. As described above, in some examples, a maximum offset threshold (e.g., one second) between the first audio content and the second audio content may be determined, and the plurality of portions of the second audio content may be within the maximum offset threshold relative to the first audio portion. Portions of the second audio content that exceed the maximum offset threshold relative to the first audio portion may be excluded from this comparison.

At operation 720, a second portion of the second audio content is identified that has second audio characteristics that are within a selected range of similarity to the first audio characteristics. For example, as shown in FIG. 2, when the first audio characteristics of audio portion 206A are compared to the second audio characteristics of audio portion 202B, it is determined that the second audio characteristics are within the selected range of similarity to the first audio characteristics, meaning that they match one another. As described above, in some examples, the selected range of similarity may be a selected value, such as a selected numerical value, a selected percentage, a selected ratio, and the like, which represents a relative similarity of audio characteristics between compared audio portions. As also described above, in some examples, the second audio characteristics may be second frequency domain characteristics of the second portion. The second frequency domain characteristics may be determined based at least in part on a Fast Fourier Transform (FFT), such as by performing an FFT on the second audio portion to convert the second audio portion into the frequency domain. In some examples, to confirm the matching of the first and second audio portions, audio characteristics of adjacent pairs of audio portions may also be matched, such as by matching audio characteristics of audio portions 205A and 201B and by matching audio characteristics of audio portions 207A and 203B as shown in FIG. 3.

At operation 722, a temporal offset is calculated between the first portion and the second portion. The temporal offset is the time difference between the first portion and the second portion. As shown in FIG. 3, the temporal offset 250 is the time difference between audio portion 206A and audio portion 202B. The temporal offset 250 will also be equal to the time difference between other sets of matching audio portions, such as between audio portion 205A and audio portion 201B, between audio portion 207A and audio portion 203B, etc. The temporal offset 250 may correlate to an offset between the times that matching audio portions are sampled by synchronization component 116. In the example of FIG. 3, the temporal offset 250 is 0.08 seconds. In some examples, the temporal offset 250 may be calculated based on the difference between the timestamps of the matching audio portions. For example, the difference between the timestamp of audio portion 206A (which is 0.10) and the timestamp of audio portion 202B (which is 0.02) is a value of 0.08, which correlates to a difference of 0.08 seconds in this example.

At operation 724, the video content and the second audio content are synchronized within the output content. The synchronizing is achieved by adjusting, based on an amount of the temporal offset, a relative timing between a transmission of the second audio content and a transmission of video content. The adjusting may include delaying, based on an amount of the temporal offset, a transmission of the second audio content relative to a transmission of video content. For example, as shown, in FIG. 4, the second audio content 112 may be delayed by 0.08 seconds, which is the amount of the temporal offset 250. The delay 141 of 0.08 seconds may be applied to the transmission of the second audio content 112 within the output content 120, which may cause the second audio content 112 to be synchronized with the video content 110 within the output content 120. In some examples, the transmission of the second audio content may be delayed by an exact amount of the temporal offset. In other examples, the transmission of the second audio content may be delayed by another amount based on the temporal offset (e.g., a close approximation, etc.).

As described above, because it may often take longer to capture video than to capture audio, the second audio content 112 will typically be ahead of the video content 110 when the second audio content is initially received by the computing device 115. This is why it will typically be necessary to delay the second audio content 112 in order to synchronize the audio content 112 with the video content 110. It is possible, however, that, in some scenarios, the second audio content 112 may be behind the video content 110 when the second audio content is initially received by the computing device 115. This may occur, for example, if the second capture component 122 adds a greater delay than the first capture component 121. In this scenario, rather than delaying the second audio content 112 by the amount of the temporal offset, it may be necessary to instead delay the video content 110 by the amount of the temporal offset. Thus, in this scenario, the adjusting that is performed at operation 724 (to synchronize the video content and the second audio content) may include delaying, based on an amount of the temporal offset, the transmission of the video content relative to the transmission of the second audio content. In some examples, the transmission of the video content may be delayed by an exact amount of the temporal offset. In other examples, the transmission of the video content may be delayed by another amount based on the temporal offset (e.g., a close approximation, etc.).

Figure 8:
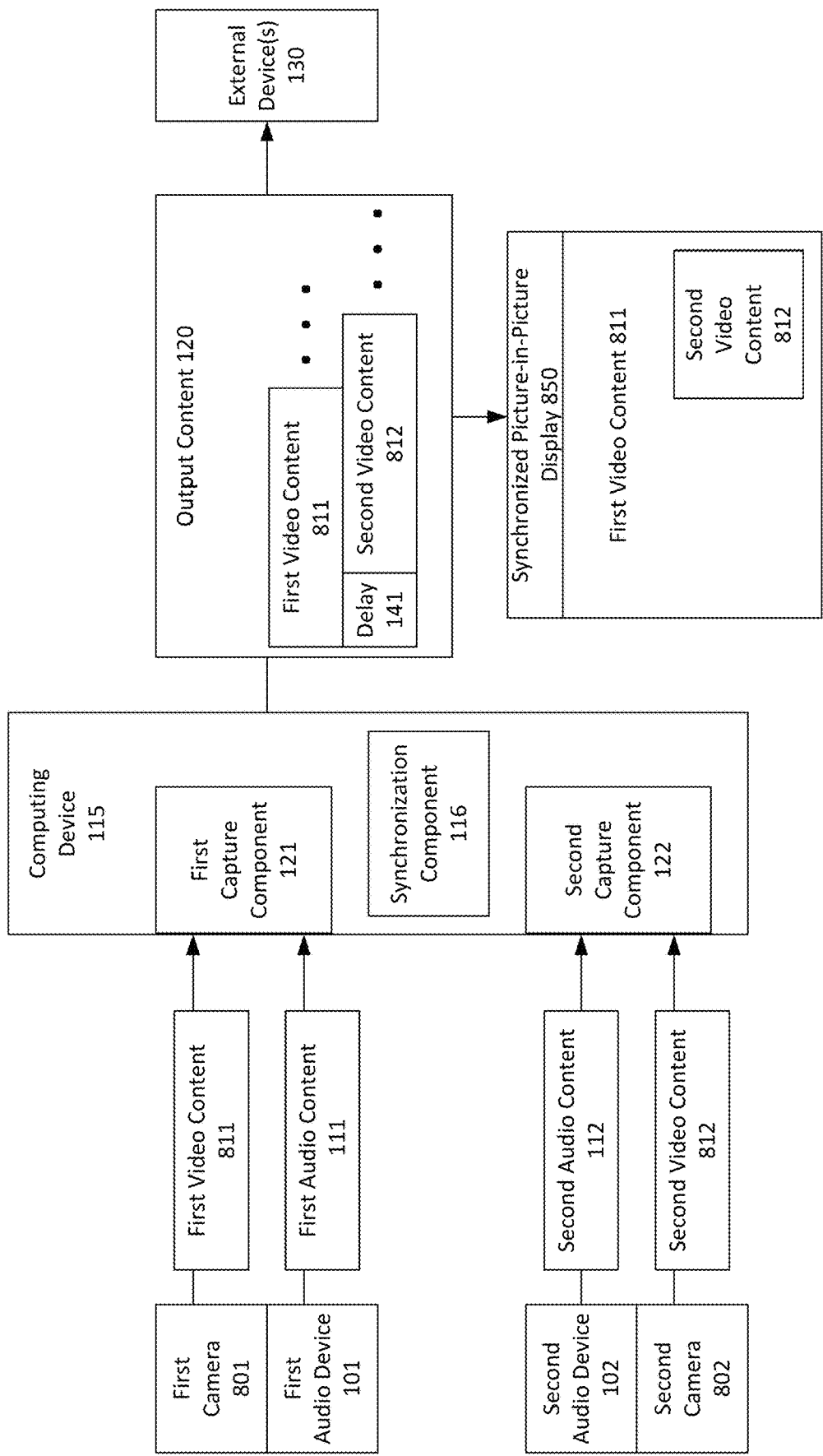
FIG. 8 is a diagram illustrating an example video synchronization system that may be used in accordance with the present disclosure.

While the above description includes examples relating to audio and video synchronization, the techniques described herein may also be used for video synchronization, such as to synchronize video from two or more different cameras. For example, in a scenario in which two cameras both have integrated audio devices, the video from the two cameras may be synchronized by determining a temporal offset for synchronizing the audio from the two integrated audio devices (e.g., using the techniques described above), and then delaying the video from one of the cameras by the amount of the temporal offset. Referring now to FIG. 8, an example video synchronization system will now be described in detail. As shown in FIG. 8, first audio device 101 is integrated with a first camera 801. Similar to camera 100 and video content 110 of FIG. 1, first camera 801 provides first video content 811 that is captured by the computing device 115 using first capture component 121 (the same component that is used to capture first audio content 111). Thus, the first video content 811 and the first audio content 111 are synchronized with one another when they are received by the computing device 115. As also shown in FIG. 8, second audio device 102 is integrated with second camera 802. In this example, second camera 802 provides second video content 812 that is captured by the computing device 115 using second capture component 122 (the same component that is used to capture second audio content 112). Thus, the second video content 812 and the second audio content 112 are synchronized with one another when they are received by the computing device 115. As should be appreciated, however, because they are received by different capture components, the first video content 811 and the first audio content 111 are not synchronized with the second video content 812 and the second audio content 112 when they are all received by the computing device 115.

In the example of FIG. 8, both the first video content 811 and the second video content are included in the output content 120, and the synchronization component 116 synchronizes the first video content 811 and the second video content 812 within the output content 120. In the specific example of FIG. 8, the first video content 811 and the second video content 812 are included as part of a synchronized picture-in-picture display 850 within the output content 120. It is noted, however, that synchronized picture-in-picture display 850 is merely one example technique for displaying both the first video content 811 and the second video content 812 in the output content 120 and that other techniques may be employed, such as a synchronized split-screen view that includes both the first video content 811 and the second video content 812, a view that periodically alternates between portions of the first video content 811 and the second video content 812, and other techniques. In some examples, a user of the computing device 115 may configure and edit how the first video content 811 and the second video both content 812 are displayed within the output content 120. Also, in some examples, the first video content 811 and the second video content 812 may both be transmitted to other computing devices on which other users may configure and edit how the first video content 811 and the second video content are displayed.

In order to synchronize the first video content 811 with the second video content 812, the synchronization component 116 may determine a temporal offset for synchronizing the first audio data 111 with the second audio data 112, such as by using the techniques described above with reference to FIGS. 1-7. As described above, the temporal offset may be determined by comparing audio characteristics (e.g., frequency domain characteristics) of portions of the first audio content 111 and the second audio content 112 to find matching portions and then determining the temporal offset between the matching portions. The synchronization component 116 may then adjust, within the output content 120, a relative timing between a transmission of the second video content 812 and a transmission of the first video content 811. For example, if the first video content 811 is behind the second video content 812 when received by the computing device 115, then the synchronization component 116 may delay the transmission of the second video content 812 by the amount of the temporal offset (as shown in the example of FIG. 8). This may occur, for example, if the first capture component 121 adds a greater delay than the second capture component 122. By contrast, if the second video content 812 was behind the first video content 811 when received by the computing device 115, then the synchronization component 116 may delay the transmission of the first video content 811 by the amount of the temporal offset. This may occur, for example, if the second capture component 122 adds a greater delay than the first capture component 121.

Figure 9:
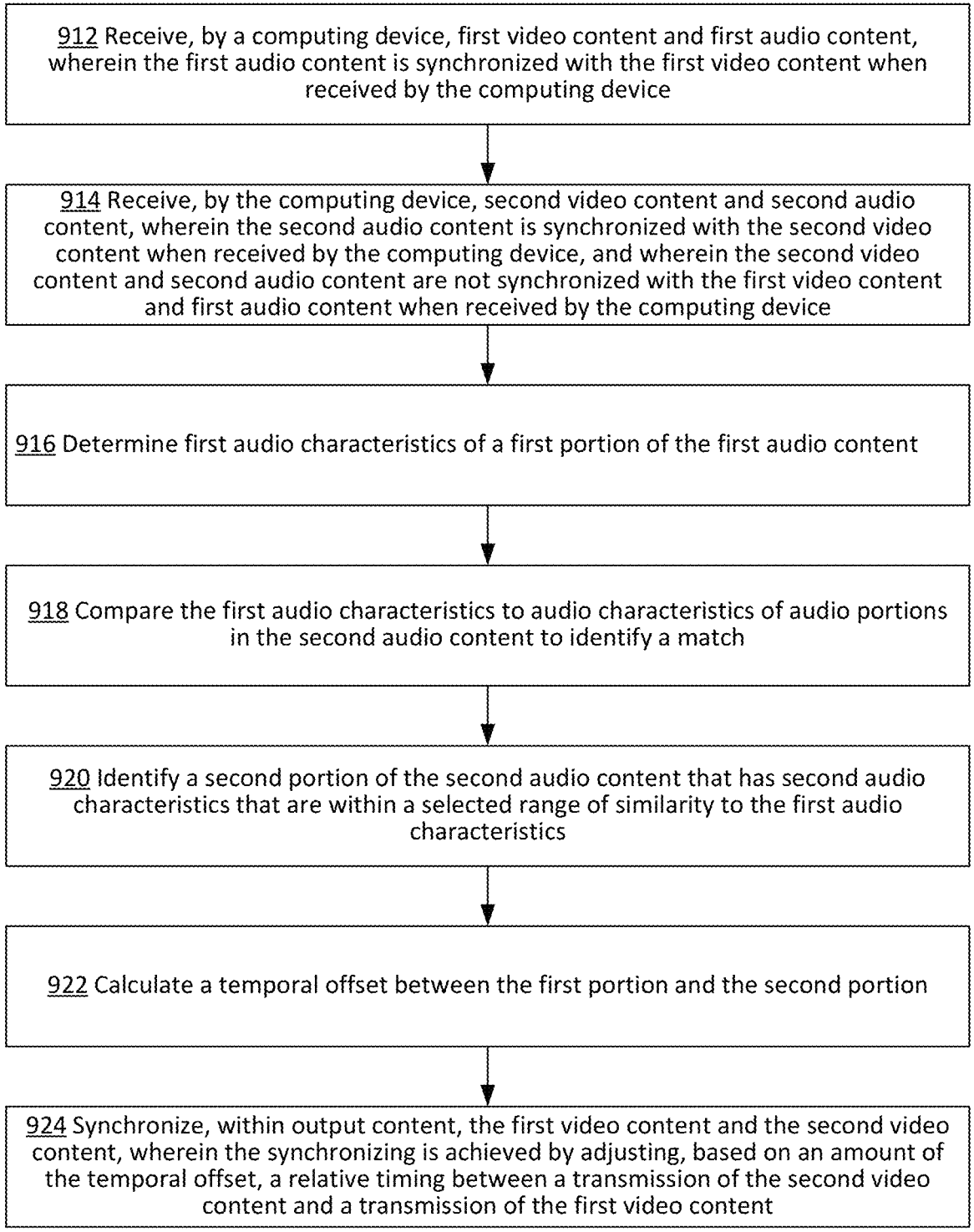
FIG. 9 is a flowchart illustrating an example process for video synchronization that may be used in accordance with the present disclosure.

Referring now to FIG. 9, an example process for video synchronization will now be described in detail. The process of FIG. 9 is initiated at operation 912, at which first video content and first audio content are received by a computing device. For example, as shown in FIG. 8, first video content 811 provided by a first camera 801 is received by computing device 115 via first capture component 121. Additionally, first audio content 111 provided by first audio device 101 is received by computing device 115 via first capture component 121. As described above, because the first audio content 111 and the first video content 811 are received by the computing device 115 via the same capture component (first capture component 121), they are synchronized with one another when received by the computing device 115. In the example of FIG. 8, the first audio device 101 is integrated with the first camera 801. The first video content may be included in output content that is transmitted by the computing device. For example, as shown in FIG. 8, the first video content 811 is included in output content 120.

At operation 914, second video content and second audio content are received by the computing device. For example, as shown in FIG. 8, second video content 812 provided by a second camera 802 is received by computing device 115 via second capture component 122. Additionally, second audio content 112 provided by second audio device 102 is received by computing device 115 via second capture component 122. As described above, because the second audio content 112 and the second video content 812 are received by the computing device 115 via the same capture component (second capture component 121), they are synchronized with one another when received by the computing device 115. As should be appreciated, however, because they are received by different capture components, the first video content 811 and the first audio content 111 are not synchronized with the second video content 812 and the second audio content 112 when they are all received by the computing device 115. In the example of FIG. 8, the second audio device 102 is integrated with the second camera 802. The second video content may be included in output content that is transmitted by the computing device. For example, as shown in FIG. 8, the second video content 812 is included in output content 120. In some examples, the first video content and the second video content may be live video content that is transmitted by the computing device and played to viewers at external devices using live streaming techniques.

It is noted that operations 916-922 of FIG. 9 correspond to operations 716-722 of FIG. 7, respectively. Thus, the descriptions from operations 716-722 of FIG. 7 may be considered to apply to operations 916-922 of FIG. 9, and these descriptions are not repeated here. At operation 916, first characteristics of a first portion of the first audio content are determined. At operation 918, the first audio characteristics are compared to audio characteristics of audio portions in the second audio content to identify a match. At operation 920, a second portion of the second audio content is identified that has second audio characteristics that are within a selected range of similarity to the first audio characteristics. At operation 922, a temporal offset is calculated between the first portion and the second portion.

At operation 924, the first video content and the second video content are synchronized within the output content. The synchronizing is achieved by adjusting, based on an amount of the temporal offset, a relative timing between a transmission of the second video content and a transmission of the video first content. In some examples, the first video content may be behind the second video content. This may occur, for example, if the first capture component 121 adds a greater delay than the second capture component 122. In these examples, the adjusting may include delaying, based on an amount of the temporal offset, a transmission of the second video content relative to a transmission of the first video content. For example, as shown in FIG. 8, a delay 141 may be applied to the transmission of the second video content 812 within the output content 120, which may cause the second video content 812 to be synchronized with the first video content 811 within the output content 120. In some examples, the transmission of the second video content may be delayed by an exact amount of the temporal offset. In other examples, the transmission of the second video content may be delayed by another amount based on the temporal offset (e.g., a close approximation, etc.).

In some other examples, the second video content may be behind the first video content. This may occur, for example, if the second capture component 122 adds a greater delay than the first capture component 121. In these examples, the adjusting may include delaying, based on an amount of the temporal offset, a transmission of the second video content relative to a transmission of the first video content. In some examples, the transmission of the first video content may be delayed by an exact amount of the temporal offset. In other examples, the transmission of the first video content may be delayed by another amount based on the temporal offset (e.g., a close approximation, etc.).

It is noted that, in some examples, the techniques for audio/video synchronization (such as shown in FIG. 7) and the techniques for video/video synchronization (such as shown in FIG. 9) may be performed in combination with one another. For example, in some cases, the audio/video synchronization techniques shown in FIG. 7 may be employed to perform a first synchronization of the second audio content with the first video content. Additionally, the video/video synchronization techniques shown in FIG. 9 may be employed to perform a second synchronization of the second video content with the first video content. In this example, because the second audio content and the second video content are captured via the same capture component, the same temporal offset adjustment used to synchronize the second audio content with the first video content may also be used to synchronize the second video content with the first video content. Thus, there would not be a need to perform the same steps repeatedly at both operations 716-722 of FIG. 7 and at operations 916-922 of FIG. 9. Rather, those steps could be performed only once.

Figure 10:
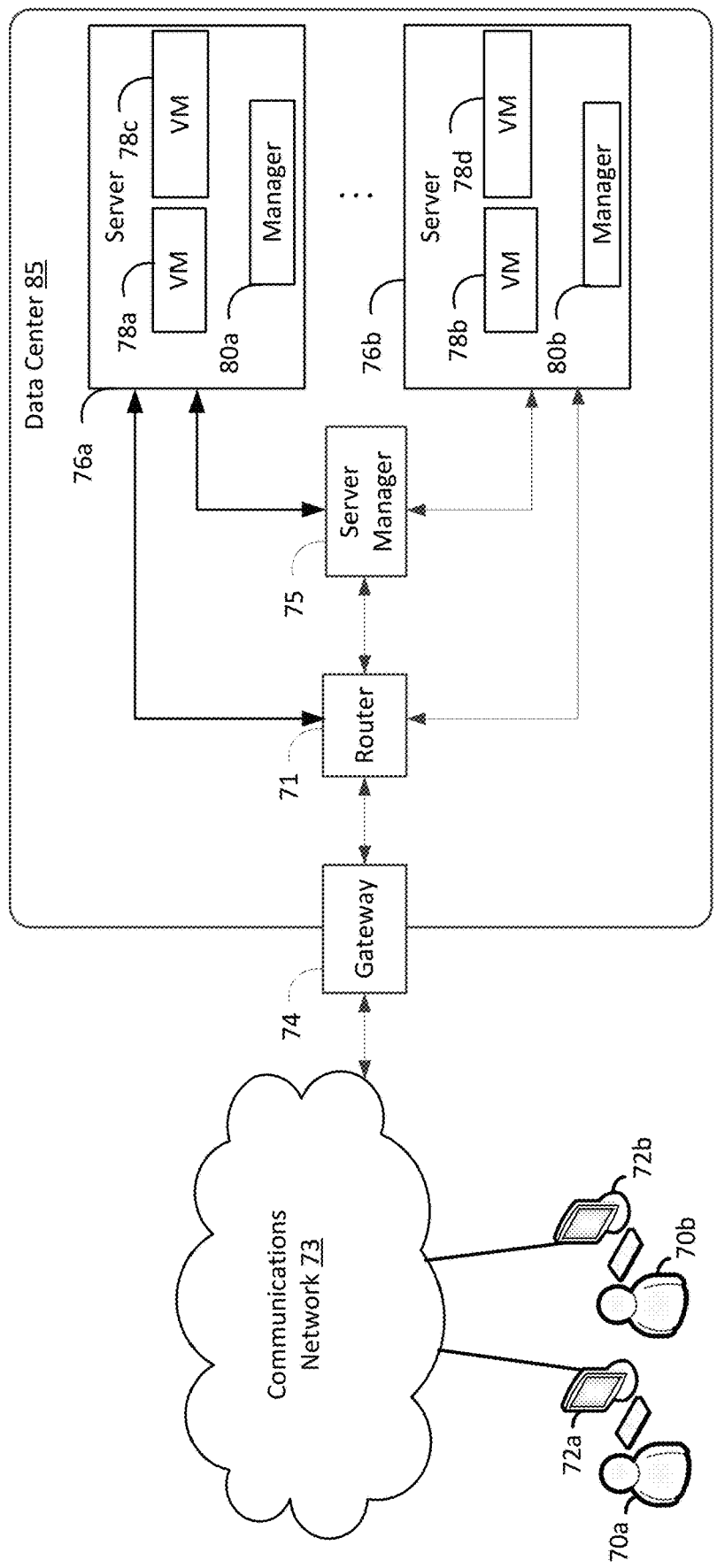
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
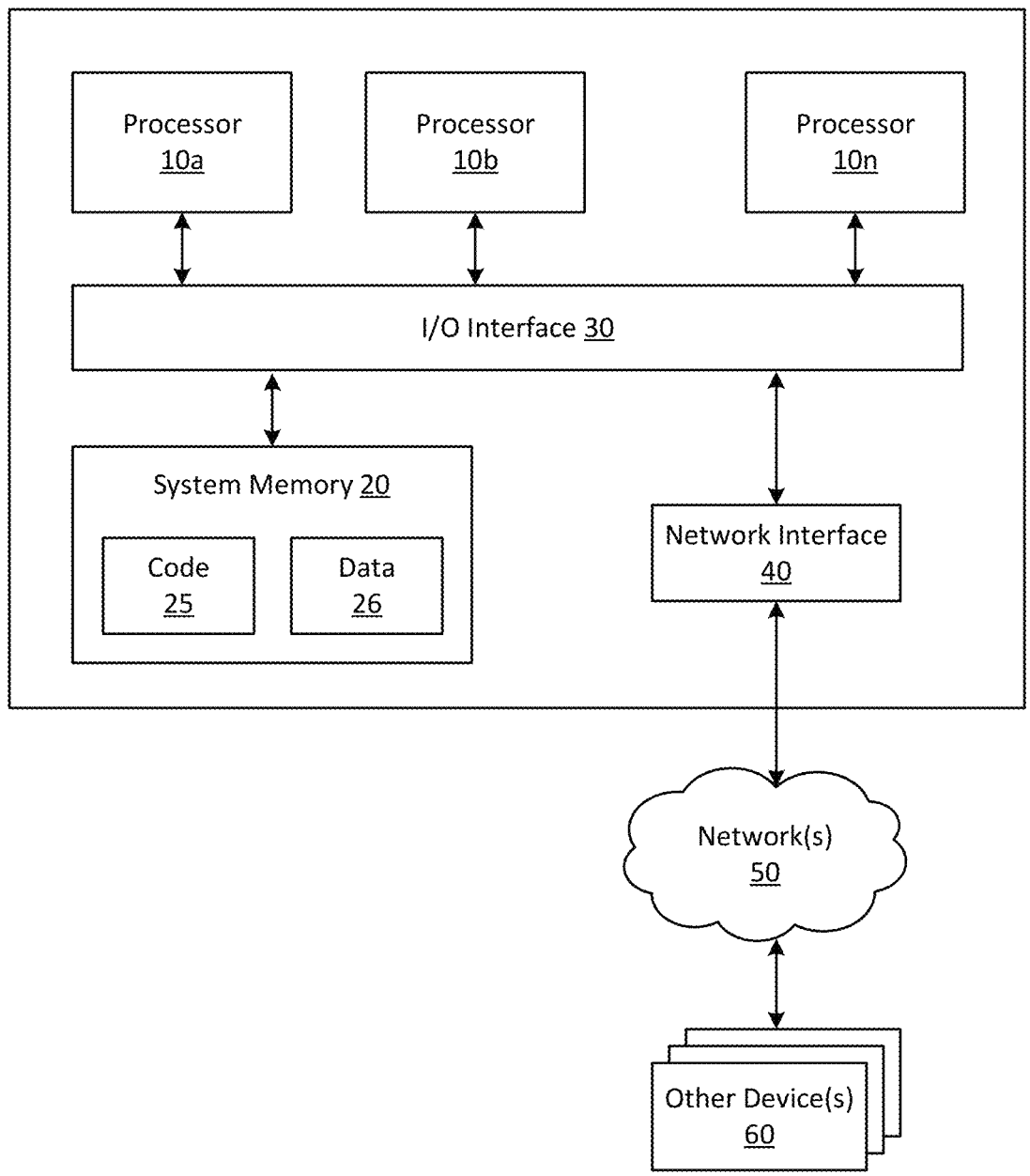
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving, by a computing device, video content and first audio content, wherein the first audio content is synchronized with the video content, and wherein the video content is included in output content that is transmitted by the computing device;
receiving, by the computing device, second audio content that is not synchronized with the video content when the second audio content is received by the computing device, wherein the second audio content is also included in the output content;
determining first audio characteristics of a first portion of the first audio content;
comparing the first audio characteristics to a plurality of audio characteristics of a plurality of portions of the second audio content to identify a portion of the second audio content that matches the first portion, wherein a maximum offset threshold between the first audio content and the second audio content is determined, wherein the plurality of portions of the second audio content are within the maximum offset threshold relative to the first portion, and wherein attempts are made to match the first portion only with the plurality of portions of the second audio content that are within the maximum offset threshold relative to the first portion;
identifying a second portion of the plurality of portions of the second audio content that has second audio characteristics of the plurality of audio characteristics that are within a selected range of similarity to the first audio characteristics;
calculating a temporal offset between the first portion and the second portion; and
synchronizing, within the output content, the video content and the second audio content, wherein the synchronizing is achieved by delaying, by an amount of the temporal offset, a transmission of the second audio content relative to a transmission of video content.

2. The computing system of claim 1, wherein the video content is live video content that is transmitted by the computing device and played to viewers using live streaming techniques.

3. The computing system of claim 1, wherein the video content is provided by a camera, and wherein the first audio content is provided by an audio device that is integrated with the camera.

4. The computing system of claim 1, wherein the first audio characteristics are first frequency domain characteristics of the first portion, and wherein the second audio characteristics are second frequency domain characteristics of the second portion.

5. A computer-implemented method comprising:
receiving, by a computing device, first video content and first audio content, wherein the first audio content is synchronized with the first video content, and wherein the first video content is included in output content that is transmitted by the computing device;
receiving, by the computing device, second audio content that is not synchronized with the first video content when the second audio content is received by the computing device, wherein the second audio content is also included in the output content;
determining first audio characteristics of a first portion of the first audio content;
comparing the first audio characteristics to a plurality of audio characteristics of a plurality of portions of the second audio content to identify a portion of the second audio content that matches the first portion, wherein a maximum offset threshold between the first audio content and the second audio content is determined, and wherein the plurality of portions of the second audio content are within the maximum offset threshold relative to the first portion, and wherein attempts are made to match the first portion only with the plurality of portions of the second audio content that are within the maximum offset threshold relative to the first portion;
identifying a second portion of the second audio content that has second audio characteristics that are within a selected range of similarity to the first audio characteristics;
calculating a temporal offset between the first portion and the second portion; and
performing a first synchronization, within the output content, of the first video content and the second audio content, wherein the first synchronization is achieved by delaying, based on an amount of the temporal offset, a transmission of the second audio content relative to a transmission of the first video content.

6. The computer-implemented method of claim 5, further comprising:
receiving, by the computing device, second video content, wherein the second video content is synchronized with the second audio content when the second video content and the second audio content are received by the computing device; and
performing a second synchronization of the first video content and the second video content, wherein the second synchronization is achieved by delaying a transmission of the second video content based on the amount of the temporal offset.

7. The computer-implemented method of claim 6, wherein the second video content is also included in the output content, and wherein the output content comprises a picture-in-picture display that includes the first video content and the second video content.

8. The computer-implemented method of claim 6, wherein the second video content is provided by a camera, and wherein the second audio content is provided by an audio device that is integrated with the camera.

9. The computer-implemented method of claim 5, wherein the plurality of portions include the second portion and a third portion, and wherein the second portion and the third portion partially overlap one another.

10. The computer-implemented method of claim 5, wherein the first audio content is provided by a first audio device, wherein the second audio content is provided by a second audio device, and wherein the second audio device is a higher quality audio device than the first audio device.

11. The computer-implemented method of claim 5, wherein the first audio characteristics are first frequency domain characteristics of the first portion, and wherein the second audio characteristics are second frequency domain characteristics of the second portion.

12. The computer-implemented method of claim 11, wherein the first frequency domain characteristics and the second frequency domain characteristics are determined based at least in part on a Fast Fourier Transform.

13. The computer-implemented method of claim 5, wherein the first video content includes video of a user, and wherein the first audio content and the second audio content include audio of words that are spoken by the user in the first video content.

14. One or more non-transitory computer-readable storage media having stored thereon computing instructions that, upon execution by a computing device, cause the computing device to perform operations comprising:
   receiving video content and first audio content, wherein the first audio content is synchronized with the video content, and wherein the video content is included in output content that is transmitted by the computing device;
   receiving second audio content that is not synchronized with the video content when the second audio content is received by the computing device, wherein the second audio content is also included in the output content;
   determining first audio characteristics of a first portion of the first audio content;
   comparing the first audio characteristics to a plurality of audio characteristics of a plurality of portions of the second audio content to identify a portion of the second audio content that matches the first portion, wherein a maximum offset threshold between the first audio content and the second audio content is determined, and wherein the plurality of portions of the second audio content are within the maximum offset threshold relative to the first portion, and wherein attempts are made to match the first portion only with the plurality of portions of the second audio content that are within the maximum offset threshold relative to the first portion;
   identifying a second portion of the second audio content that has second audio characteristics that are within a selected range of similarity to the first audio characteristics;
   calculating a temporal offset between the first portion and the second portion; and
   synchronizing, within the output content, the video content and the second audio content, wherein the synchronizing is achieved by adjusting, based on an amount of the temporal offset, a relative timing between a transmission of the second audio content and a transmission of the video content.

15. The one or more non-transitory computer-readable storage media of claim 14, wherein the adjusting the relative timing comprises delaying the transmission of the second audio content relative to the transmission of the video content.

16. The one or more non-transitory computer-readable storage media of claim 14, wherein the adjusting the relative timing comprises delaying the transmission of the video content relative to the transmission of the second audio content.

17. The one or more non-transitory computer-readable storage media of claim 14, wherein the first audio characteristics are first frequency domain characteristics of the first portion, and wherein the second audio characteristics are second frequency domain characteristics of the second portion.

18. The one or more non-transitory computer-readable storage media of claim 14, wherein the first audio content is not included in the output content.

19. The computer-implemented method of claim 5, wherein the first audio content is not included in the output content.

* * * * *